Dec. 13, 1960    A. W. VANCE    2,964,649
COINCIDENCE SENSING DEVICE
Filed Jan. 28, 1950

Inventor
ARTHUR W. VANCE
By
Morris A. Rahn
Attorney

United States Patent Office 2,964,649
Patented Dec. 13, 1960

2,964,649

COINCIDENCE SENSING DEVICE

Arthur W. Vance, Union Valley, N.J., assignor, by mesne assignments, to the United States of America as represented by the Secretary of the Navy Filed Jan. 28, 1950, Ser. No. 141,036

7 Claims. (Cl. 307—88.5)

This invention relates to control circuits and more particularly is an improvement in voltage coincidence sensing systems.

The sensing of the coincidence in amplitude of two or more voltages finds a wide spread use in the field of electronics. A great number of applications arise where it is desired to compare a variable voltage with a standard voltage for the purpose of adjusting the variable voltage-producing apparatus until its output equals the standard value. Summing circuits in computers, wherein the computer is adjusted until the indicated sum is substantially zero, are essentially coincidence sensing systems. Other applications are monitoring systems wherein it is desired to provide an alarm each time one variable voltage attains the level of a second variable voltage.

A number of systems are used for indicating coincidence such as, applying the voltages to an oscilloscope for a visual indication, or, to the grids of two push-pull connected tubes whose output is a null at coincidence. Prior art systems such as these, however, require power for their operation, are expensive, and do not lend themselves to providing compact equipment.

It is an object of my present invention to provide an improved voltage coincidence sensing circuit which is simpler than those of the prior art.

It is a further object of my present invention to provide an improved voltage coincidence sensing circuit which is more inexpensive in cost and operation than those of the prior art.

It is a still further object of my present invention to provide an improved voltage coincidence sensing circuit which is more compact than those of the prior art.

These and further objects of my present invention are achieved by applying, to the input of a rectifier or diode, the two voltages, whose amplitude coincidence is desired to be sensed, to buck each other. A third voltage consisting of a very small A.C. voltage of frequency $f_1$ is also applied to the diode input. The diode output is applied to a band pass filter tuned to a harmonic of the applied A.C. voltage, either the second or higher as desired. The characteristics of the diode are such that it acts as an efficient harmonic generator within only a very small voltage region about zero applied voltage. Therefore, when the applied bucking voltages are substantially equal to each other the diode generates harmonics of the small applied A.C. voltage. Therefore, the filter provides an output only when there is voltage coincidence.

Figure 1:
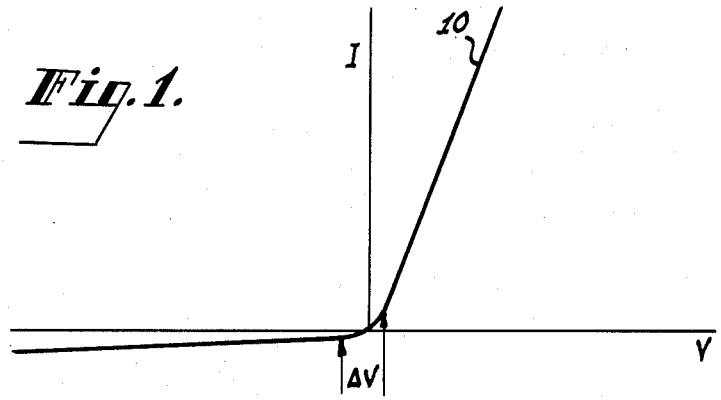
Figure 2:
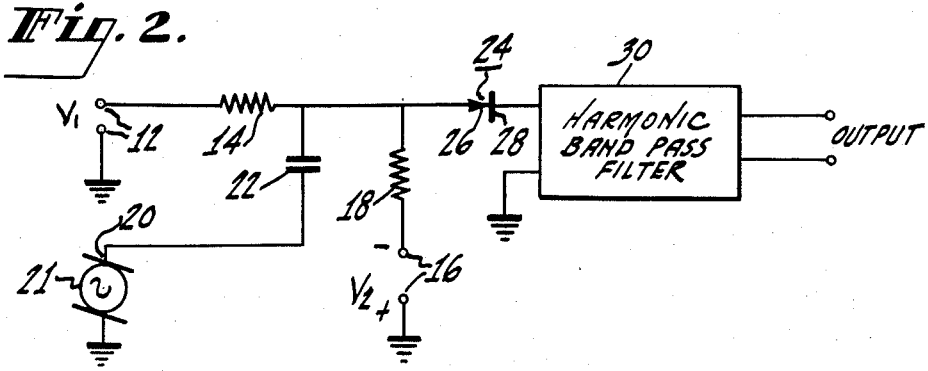

The novel features of the invention as well as the invention itself, both as to its method of organization and operation, will best be understood from the following description, when read in connection with the accompanying drawing, in which Figure 1 is a curve of the current vs. voltage characteristic of a crystal diode, and Figure 2 is a circuit diagram of a preferred embodiment of the invention.

Figure 1 is a curve 10 representing the variations of current obtained from a crystal diode such as germanium with variations in voltage applied to the crystal diode anode. It may be seen that, except for a small region $\Delta V$ above and below zero volts, the characteristic is substantially a straight line. Within this curved or non-linear portion of its characteristic the crystal acts as a most efficient harmonic generator. For an applied sine wave the second harmonic output from the diode has the largest amplitude. Other harmonics are also present, but to a lesser degree.

Referring to Fig. 2, a pair of terminals 12 serve as an input for a first voltage $V_1$. A limiting resistor 14 serves to couple the terminals with the anode 26 of a crystal diode 24. A second pair of terminals 16 serves as an input for a second voltage $V_2$. A second limiting resistor 18 serves to couple the terminals with the anode 26 of the crystal diode 24. A third pair of terminals 20 serves as an input for a small A.C. voltage from an A.C. voltage source 21. The A.C. voltage amplitude is preferably limited to the voltage range $\Delta V$ within which the crystal diode 24 provides a non-linear response. A condenser 22 serves to couple a third pair of input terminals 20 to the anode 26 of the crystal diode 24. The first and second voltages, $V_1$ and $V_2$, are both applied with opposite polarity so that, at the crystal diode, one opposes the other.

The crystal diode 24 may be any of the well-known crystals which are usable as rectifiers such as selenium or galena, but I prefer to use germanium because of its stability and ruggedness. The cathode 28 or output from the crystal diode is coupled to a band pass filter 30. This filter may be tuned to pass either a second or a higher harmonic of the applied A.C. voltage. I prefer the second harmonic since this is the one which is produced with the greatest amplitude and therefore provides the most positive signal.

The band pass filter 30 will then provide an output when the resultant voltage applied to the crystal diode is substantially zero. If the values of the first and second limiting resistors 14, 18 are the same, this condition arises when the applied variable voltages $V_1$ and $V_2$ are equal in amplitude. If the values of the first and second limiting resistors 14, 18 are not the same, then coincidence occurs when the applied variable voltages have the same amplitude ratio as the ratio of the values of the resistors through which they are applied to the diode. Although this embodiment of the invention has been shown and described in connection with obtaining the coincidence of two voltages, it is obvious that the invention may be extended to indicate coincidence of more than two voltages. As many voltages as desired may be connected to the crystal diode, care being taken to use limiting resistors of sufficient value that the crystal breakdown point is not exceeded.

The foregoing principles, although illustrated and explained in connection with a crystal diode, are operable with other types of rectifiers or devices which have characteristics similar to the one shown, namely, a non-linear output region with a substantially linear output region on either side of the non-linear region. Dry disc types of rectifiers, such as, copper oxide or the iron oxide type, exhibit these characteristics. An ordinary electronic diode tube also has these characteristics. In the event the device exhibits slightly non-linear characteristics on either side of a very non-linear region a bias may be applied to the output of the device in well known fashion so that only the harmonics obtained from the coincidence indicating region which are of the maximum amplitude are derived as output.

In an embodiment of the invention wherein a germanium diode was used, over a range of 100 volts applied to the diode, accuracy in coincidence indication was obtained to 0.1 volt indicating an average accuracy of 1 part in 1000. The band pass filter was tuned to the second harmonic of the applied A.C. voltage.

From the foregoing description it will be readily apparent that I have provided an improved, simple and inexpensive system or apparatus for sensing the coincidence in amplitude of two voltages. Although I have shown and described but a single embodiment of my present invention, it should be apparent that many changes may be made in the particular embodiment herein disclosed, and that many other embodiments are possible, all within the spirit and scope of my invention. Therefore, I desire that the foregoing description shall be taken as illustrative and not as limiting.

What is claimed is:

1. A voltage coincidence sensing circuit comprising a device having an input and an output and an output characteristic curve wherein the output current of said device varies substantially linearly with applied input voltage except for a region wherein said output current varies non-linearly with said applied input voltage, means to apply at least two opposing variable voltages to said device input, means to apply an A.C. voltage having an amplitude substantially equal to the voltage range of the region of non-linearity of said device and a band pass filter coupled to said device output, said filter being tuned to pass only a harmonic of said A.C. voltage to provide an output only when the resultant amplitude of said opposing variable voltages substantially falls within the voltage values which provide said non-linear output current.

2. A voltage coincidence sensing circuit as recited in claim 1 wherein said device is a rectifier.

3. A voltage coicidence sensing circuit as recited in claim 1 wherein said device is a crystal diode.

4. A voltage coincidence sensing circuit comprising a diode having an input and an output, means to apply to said diode input at least two opposing variable voltages, means to apply an A.C. voltage having a small amplitude to said diode input, and a band pass filter coupled to said diode output, said filter being tuned to pass only a harmonic of said A.C. voltage to provide an output only when said opposing variable voltages substantially cancel each other.

5. A voltage coincidence sensing circuit as recited in claim 4 wherein said diode is made of germanium.

6. A voltage coicidence sensing circuit comprising a crystal diode having an input and an output, a first resistor having one end connected to said diode input and an input terminal on the other end for the application of a first variable voltage, a second resistor having one end connected to said diode input and an input terminal on the other end for the application of a second variable voltage in opposition to said first voltage, a condenser having one end connected to said diode input and an input terminal on the other end for the application of a small A.C. voltage, and a band pass filter connected to said diode output, said band pass filter being tuned to a harmonic of said alternating current voltage to provide an output when the voltages applied at said diode input from said first and second voltages are substantially equal.

7. A voltage coincidence sensing circuit as recited in claim 6 wherein said crystal diode is made of germanium, said band pass filter is tuned to the second harmonic of said small A.C. voltage and said small A.C. voltage has an amplitude which is within the range of maximum non-linearity of the crystal diode characteristic.

No references cited.